Patented Nov. 18, 1941

2,263,448

UNITED STATES PATENT OFFICE 2,263,448

POLY-CYCLOHEXYL-DIPHENYLS

Frank B. Smith and Harold W. Moll, Midland, Mich., assignors to The Dow Chemical Company, Midland, Mich., a corporation of Michigan No Drawing. Application September 15, 1938, Serial No. 230,027

3 Claims. (Cl. 260—668)

This invention concerns certain new chemical products, namely, cyclohexyl-diphenyls containing at least three cyclohexyl groups per diphenyl molecule. All such compounds are herein referred to as "poly-cyclohexyl-diphenyls." The invention also concerns mixtures of such compounds.

The poly-cyclohexyl-diphenyls and their mixtures vary in physical properties from high-boiling viscous liquids to brittle glass-like resins depending upon the number of cyclohexyl groups present in the molecule. They are substantially insoluble in water, but are soluble in a number of organic solvents such as benzene, toluene, chlorbenzene, carbon tetrachloride, etc. The poly-cyclohexyl-diphenyls and mixtures thereof may be employed as plasticizing agents for cellulose ethers, e. g. ethyl cellulose, benzyl cellulose, etc., to prepare plastic compositions of unusual hardness and high tensile strength. Liquid mixtures of poly-cyclohexyl-diphenyls are also suitable for use as dielectric fluids in transformers, switches, and other electrical apparatus.

The poly-cyclohexyl-diphenyls are prepared by reacting diphenyl or a lower cyclohexylated diphenyl with a cyclohexylating agent, such as cyclohexyl chloride, cyclohexyl bromide, cyclohexene, etc., in the presence of an alkylation catalyst, e. g. aluminum chloride, iron chloride, boron trifluoride, activated bleaching earths such as Retrol and Tonsil, etc. In a preferred mode of operation, the new products are prepared by reacting cyclohexene with diphenyl in the presence of Retrol. The yield of poly-cyclohexyl-diphenyls is highest when a molecular excess of the cyclohexylating agent is employed and, accordingly, we prefer to employ approximately 2–4 moles of the cyclohexylating agent per mole of diphenyl. The amount of catalyst varies with the particular reactants employed and the conditions under which the reaction is carried out, but we usually employ between about 0.02 and about 0.2 part by weight of catalyst per part of diphenyl.

The reaction is conveniently carried out by adding the cyclohexylating agent with stirring to a heated mixture of diphenyl and the catalyst and thereafter continuing the heating and stirring until the reaction is complete. The reaction temperature is usually between about 150° C. and about 250° C. although somewhat higher temperatures may be employed. The reaction is usually complete in from 1 to 10 hours, but a longer period may sometimes be required. If desired, the time may be shortened considerably by carrying out the reaction under pressure in a closed vessel. Upon completion of the reaction, the catalyst is removed and the reaction mixture is fractionally distilled under vacuum.

The fraction distilling between about 200° C. at 20 millimeters pressure and about 280° C. at 5 millimeters pressure is a liquid mixture of mono- and di-cyclohexyl-diphenyls. Such liquid mixture constitutes a valuable by-product which may be further cyclohexylated to prepare the poly-cyclohexyl compounds of the present invention, or which may be employed or marketed as such for other purposes, e. g. for use as an intermediate in the preparation of other organic chemicals. The poly-cyclohexyl-diphenyl products are obtained as a viscous liquid mixture distilling at temperatures above about 280° C. at 5 millimeters pressure. If desired, such mixed product may be employed directly as a plasticizing agent, dielectric fluid, etc., or it may be further fractionally distilled into fractions representing isomeric tri-cyclohexyl-diphenyls, tetra-cyclohexyl-diphenyls, etc. The fraction distilling at temperatures between about 280° C. and about 315° C. at 5 millimeters pressure consists essentially of isomeric tri-cyclohexyl-diphenyls and is particularly valuable as a plasticizing agent for ethyl cellulose compositions.

The following examples illustrate several ways in which the principle of the invention has been applied, but are not to be construed as limiting the same:

*Example 1*

A mixture of 154 grams (1 mole) of diphenyl and 9.2 grams of Retrol was heated at a temperature of about 220° C. until all of the residual water contained in the Retrol had been driven off. 172 grams (2.1 moles) of cyclohexene was then added gradually with stirring over a period of about one hour. During the addition, considerable heat was evolved and the reaction temperature rose to 290° C. The mixture was held at this temperature for approximately ½ hour, after which it was cooled to about 200° C. and filtered to remove the catalyst. The filtrate was then distilled under vacuum to obtain the following fractions:

| | Fraction— | | | | |
|---|---|---|---|---|---|
| | 1 | 2 | 3 | 4 | 5 |
| Product | Unreacted diphenyl | Intermediate fraction. | Mono- and dicyclohexyl-diphenyls. | Tri-cyclohexyl-diphenyls. | Higher cyclohexylated-diphenyls. |
| Appearance | White crystalline solid | Light yellow liquid | Yellow liquid | Viscous orange liquid | Clear dark resin. |
| Boiling range | Up to 175° C. at 20 mm | 175°–205° C. at 20 mm. | 205° C. at 20 mm. to 280° C. at 5 mm. | 280°–315° C. at 5 mm | Above 315° C. at 5 mm. |
| Specific gravity | | | | 1.029 at 100/100° C. | |
| Refractive index | | | | 1.5721 at 60° C. | |

*Example 2*

A mixture of 462 grams (3 moles) of diphenyl, 728 grams (9 moles) of cyclohexene, and 10.0 grams of dried Retrol was placed in a closed steel vessel and heated with stirring at a temperature of 200° C. for approximately 1 hour. The catalyst was then filtered from the hot reaction mixture and the crude product was obtained as a yellow oil. It was distilled under vacuum to obtain fractions corresponding to those obtained in Example 1. Fraction 5 was further distilled to obtain a fraction distilling between 320° C. at 5 millimeters pressure and 320° C. at 2.5 millimeters pressure. This product was a soft resinous material having a molecular weight corresponding to that of tetra-cyclohexyl-diphenyl. It had a specific gravity of 1.012 at 100/100° C.

Other modes of applying the principle of our invention may be employed instead of those explained, change being made as regards the method herein disclosed or the materials employed provided the product claimed in any of the following claims be obtained.

We therefore particularly point out and distinctly claim as our invention:

1. A poly-cyclohexyl-diphenyl containing at least three but not more than four cyclohexyl groups.

2. A mixture consisting substantially of isomeric tricyclohexyl-diphenyls, said mixture being a viscous liquid distilling at temperatures between about 280° C. and about 315° C. under 5 millimeters pressure, and having a specific gravity of about 1.029 at 100/100° C.

3. A mixture consisting substantially of isomeric tetra-cyclohexyl-diphenyls, said mixture being a resinous solid distilling between about 320° at 5 millimeters pressure and about 320° C. at 2.5 millimeters pressure, and having a specific gravity of about 1.012 at 100/100° C.

FRANK B. SMITH.
HAROLD W. MOLL.